J. T. HENDERSON.
Combined Revolving and Drag Harrows.
No. 158,374. Patented Jan. 5, 1875.
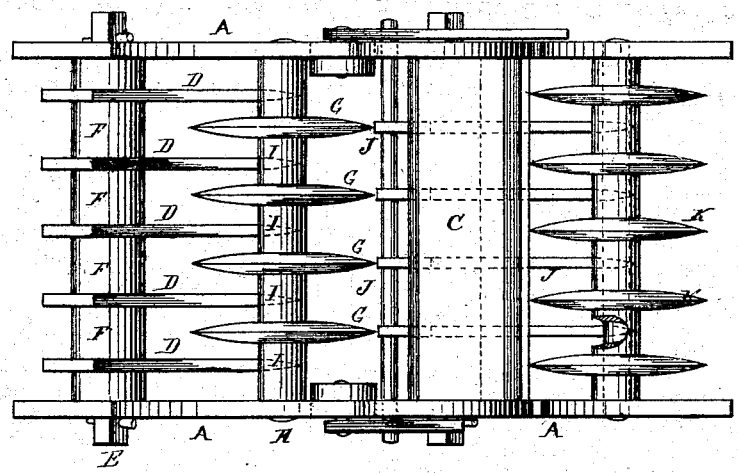
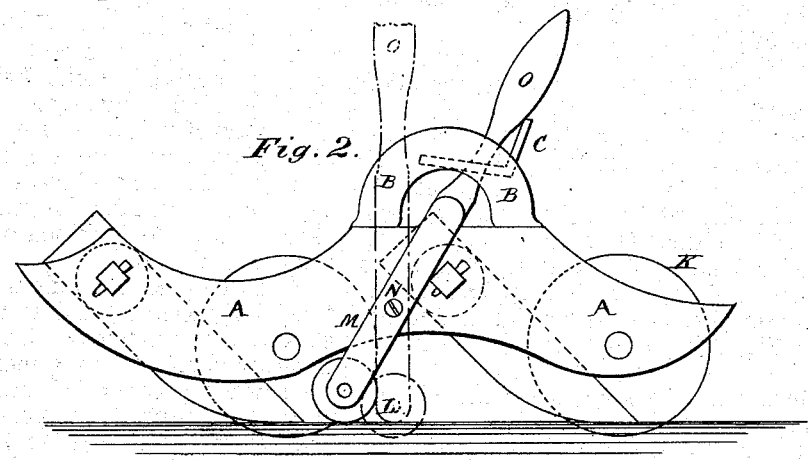
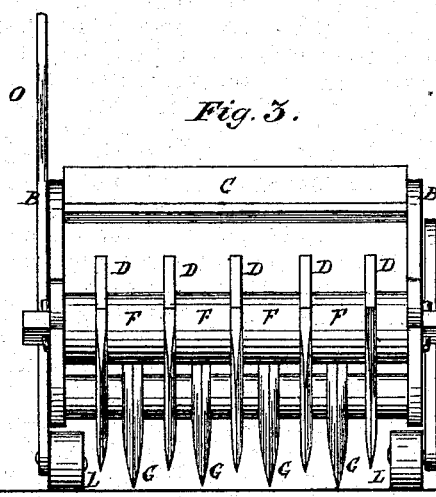
Witnesses:
Inventor:
Jas. T. Henderson.
By James L. Norris
Atty

UNITED STATES PATENT OFFICE.

JAMES T. HENDERSON, OF WOODBURY, TENNESSEE.

IMPROVEMENT IN COMBINED REVOLVING AND DRAG HARROWS.

Specification forming part of Letters Patent No. 158,374, dated January 5, 1875; application filed December 16, 1874.

*To all whom it may concern:*

Be it known that I, JAMES T. HENDERSON, of Woodbury, in the county of Cannon and State of Tennessee, have invented certain new and useful Improvements in Combined Revolving and Drag Harrow, of which the following is a specification:

The present invention has reference to a harrow of a novel construction, which is highly effective and desirable in operation, as it leaves the ground over which it is drawn in a pulverized or perfectly harrowed condition ready for planting.

My invention consists in the combination, with a series of revolving cutters arranged upon a shaft journaled in the side frames of a harrow, of fixed cutting-blades or harrow-teeth, arranged upon a transverse shaft, and extending in a diagonal rearward direction, and terminating between the revolving cutters, as will be hereinafter described.

In the accompanying drawing, Figure 1 is a top view of a harrow constructed according to the present invention. Fig. 2 is a side elevation. Fig. 3 is an end view of my invention.

The letters A A designate the runner-shaped side bars, which comprise the harrow-frame, and to the upper sides of which are attached near the center curved arms B, for supporting an elevated seat, C, extending across the frame. A series of stationary cutters or drag-teeth, D, are arranged, the front ends of said cutters being fitted on a transverse rod or fixed shaft E, which is secured to the frame pieces. The cutters are held rigidly on the shaft E, by making the same angular, or by other means, and they are held at a proper distance apart from each other by means of spacing-blocks or collars F. The front cutters extend diagonally in a rearward direction, and terminate in proper relation to a series of revolving disk-shaped cutters, G, mounted on a shaft, H, so as to revolve with the same, or thereon, if desirable. The revolving or circular cutters are held on their shaft by making the same square or polygonal, or by means of keys when the shaft is of a circular form. Spacing-blocks or collars I are also placed between the cutters, to maintain the same at the proper distances from each other. J designates a rear series of stationary cutters, and K a series of revolving disk-shaped cutters, both being constructed and arranged like the corresponding devices at the front.

The fixed drag-cutters of the front series are located in line with the rotary cutters of the rear series, this arrangement being specially effective for properly pulverizing the earth or breaking clods.

The frame pieces of the harrow run upon the top surface of the ground, and the fixed and revolving cutters penetrate or sink into the same for breaking all clods and pulverizing the earth in a very satisfactory manner. The front cutters tend to break the greater portion of the harrowing operation, and then the rear cutters follow and act upon the smaller clods or lumps of earth.

L are wheels of a small diameter, located at the sides of the frame, and journaled in the lower part of a lever-frame, M, which is pivoted to the harrow-frame by means of a transverse rod, N. One of the side bars of the lever-frame is extended in an upward direction to form a handle, O, which projects above the driver's seat.

By moving said handle in a forward direction, the wheels are raised from the ground, so as to cause the cutters and runners to rest upon the same. A movement of the lever in a rearward direction will raise the frame and cause the wheels to run upon the ground when the harrow is in position to be transported from place to place, and to be turned while at work. The change of position of the wheels is aided by the forward draft of the harrow, for as soon as the lever is moved to the rear, the wheels, by coming in contact with the ground, are thrown in a forward direction, so as to bear upon the ground to their full extent, and to support the harrow-frame in a raised frame.

What I claim is—

The combination, with a harrow, having a series of revolving cutters arranged upon a transverse shaft journaled in the side frames, of the stationary cutting-blades or harrow-teeth, arranged upon a transverse shaft and extending in a diagonal rearward direction from said shaft, and terminating between the revolving cutters, substantially as herein shown and described.

In testimony that I claim the foregoing I have hereunto set my hand.

JAS. T. HENDERSON.

Witnesses:
JAMES L. NORRIS,
JOS. L. COOMBS.